US006957043B2

(12) United States Patent

Angermann et al.

(10) Patent No.: US 6,957,043 B2
(45) Date of Patent: Oct. 18, 2005

(54) DATA COMMUNICATIONS SYSTEM INCLUDING A LOCAL BEACON

(75) Inventors: Michael Angermann, Gräfelfing (DE); Alexander Steingass, Gilching (DE); Patrick Robertson, Ammerland (DE)

(73) Assignee: Deutsches Zentrum fur Luft- und Raumfahrt E.V., Cologne (DE)

( * ) Notice: Subject to any disclaimer, the term of this patent is extended or adjusted under 35 U.S.C. 154(b) by 346 days.

(21) Appl. No.: 10/159,274

(22) Filed: Jun. 3, 2002

(65) Prior Publication Data

US 2002/0197963 A1 Dec. 26, 2002

(30) Foreign Application Priority Data

Jun. 1, 2001 (DE) ................................ 101 26 947

(51) Int. Cl.[7] ................................................ H04B 3/36
(52) U.S. Cl. ......................... 455/7; 455/402; 455/41.1; 340/310.01
(58) Field of Search ............................. 455/7, 14, 402, 455/41.1, 41.2; 340/310.01, 310.06

(56) References Cited

U.S. PATENT DOCUMENTS 5,424,859 A * 6/1995 Uehara et al. .............. 398/127
5,731,664 A * 3/1998 Posa .......................... 315/194
6,492,897 B1 * 12/2002 Mowery, Jr. ........... 340/310.01
6,606,033 B1 * 8/2003 Crocker et al. ............. 340/901

OTHER PUBLICATIONS

Abstract for WO 01/15351, "Device for Receiving and/or Transmitting Cummunications and/or Navigation Signals", Deutsches Zentrum Für Luft-Und Raumfahrt E.V., Mar. 1, 2001.
Abstract for WO 99/59261, "Wide-Band Communication System", Siemens Aktiengesellschaft, Nov. 18, 1999.

* cited by examiner

*Primary Examiner*—Lee Nguyen
(74) *Attorney, Agent, or Firm*—Browdy and Neimark, PLLC

(57) ABSTRACT

A data communications system including a local beacon (10; 9, 9'), on the one side ,being programmable and/or communicating with controlling and/or information communicating infrastructure means (16), for example a central service provider or the Internet and/or with one or more further local beacons and which, on the other side, contains for wireless communication with one or more end devices (17) located in its vicinity a transceiver combination or in special cases a transmitter only and which is located in or in place of a electric lighting equipment (1) is characterized in accordance with the invention in that the local beacon is provided with a smart cache and/or processing functionality for the data to be communicated wireless. The data communications system in accordance with the invention can be put to use for both communication and navigation by end device users.

34 Claims, 2 Drawing Sheets

DATA COMMUNICATIONS SYSTEM INCLUDING A LOCAL BEACON

BACKGROUND OF THE INVENTION

The invention relates to a data communications system including a local beacon communicating, on the one side, with controlling and/or information communicating infrastructure means, for example, a central service provider or the Internet and/or with one or more further local beacons and which, on the other side, contains for wireless communication with one or more end devices located in its vicinity a transceiver combination or in special cases a transmitter only and which is located in, on or in place of, an electric lighting equipment.

PRIOR ART

Known from DE 199 40 651 A1 and DE 198 200 760 A1 are local means for receiving and/or transmitting communications data integrated in an existing lighting means infrastructure. In accordance with DE 199 40 651 A1 the means may be assigned to a lamp, i.e. an incandescent lamp, for instance, by being accommodated therein or arranged in an adapter between the lamp and its socket. The means known from DE 198 20 760 A1 are base stations belonging to a broadband communications system capable of communicating in a communications cell to communications end devices, e.g. cordless telephones.

The base stations are screwed into incandescent lamp sockets and connected via the power supply network for broadband data communication with other base stations and/or a control means. In this case, wireless data communication between a base station and communications end devices contained in the cell thereof is made preferably via infrared beaming, but may, in principle, also be operated by radio, more particularly in the frequency range above 400 MHz and typically up to 100 GHz.

All of these known means for receiving and/or transmitting communications data integrated in the existing luminaire infrastructure are some form of a data-transparent repeater (transceiver, transponder), i.e. involving no processing or changing of information whatsoever and in which no data or information is stored.

Means for data communication—both wireless and hardwired —are costly, are often subject to nuisance delays and unreliable; all of these effects tending to become even worse with increasing distance of communication as well as with increasing number of users of the data link. This is why communication via such links needs to be minimized. In cited prior art it is provided for that means (beacons) integrated in a lighting means infrastructure, more particularly in or instead of a lamp, work exclusively as a transponder for receiving and/or transmitting data.

SUMMARY OF THE INVENTION

The invention is based on the objective of configuring a data communications system including a local beacon integrated in a lighting means infrastructure and containing a transceiver combination or in special cases a means for transmission only, so that communication from the end devices via wireless links (e.g. mobile radio links) and/or wired links (e.g. select links) with the infrastructure means are minimized in achieving reduced costs, near-zero delays and enhanced reliability even with an increase in the communications distance and number of users.

In accordance with the invention relating to a data communications system of the aforementioned kind, this objective is achieved in that the local beacon is provided with a smart cache and/or processing functionality for the data to be communicated wireless, that the cache functionality of the local beacon consists of caching information so that this information can then be sent to users equipped with a suitable end device without having to be fetched every time from the infrastructure means and that the processing functionality consists of certain processing actions, otherwise implemented in a central processing unit of the infrastructure means or in the end device itself, that are outsourced to the local beacon.

It has been discovered with the invention that it is more favorable in many applications to cache information on the local beacon containing a transceiver combination or for some cases a means for transmission only. This information can then be sent to users equipped with a suitable end device. Furthermore, processing actions involved in the data communications system in accordance with the invention can now be implemented on the local beacon without incurring costs for a link to a central processing unit. This now makes it possible to outsource processing actions cost-effectively to the local beacon which otherwise are too costly on the end device, for example due to excessive battery consumption or prohibitively long processing time.

As compared to prior art there is now, for one thing, the advantage that downloading the information from a central location to the beacon and retrieval of the information from the beacon by the user is more cost-effective than direct retrieval of the information by the user from the central location. Furthermore, there is now the advantage of less delay in retrieving information.

In this case it is to be noted that although caching information often retrieved, e.g. from web sites in the Internet, is known as such, the units implementing caching are devised as data processing systems, however, and usually reside in fixed communications networks.

In the data communications system in accordance with the invention there is now the advantage that local information can be cached on the smart local beacon without having to be retrieved every time via the data network. One example of this is a smart local beacon in a timetable system which is updated by mobile wireless for relaying to the end devices in the locality continuously or in accordance with a user requirement. The smart character of the local beacon also includes the function as to deciding which and how long data is to be cached.

Thus, for example, on first-time retrieval of a data set by a user, this data set can either be instantly transmitted to the user, assuming that the data set is saved on the beacon, or retrieved by a further network infrastructure. Then, should a further user wish to access this data set later, it can be instantly sent to the corresponding further user, again assuming that the data set is cached by the beacon. To make this kind of decision various algorithms may be used, e.g. point in time analysis of "stale" retrievals and delays in the data links via the data network infrastructure.

Wireless communication between the local beacon and the end devices may be achieved by radio, e.g. Bluetooth, wireless LAN or DVB-T requiring both the local beacon and the end devices to be designed compatible with the corresponding wireless operating mode. Wireless communication between the local beacon and the end devices can be made also by means of infrared beaming, e.g. IRDA, the local beacon and end devices then needing to be designed compatible with the corresponding infrared mode of operation.

The data communications system in accordance with the invention is not restricted to broadband communication, it also being compatible to advantage with narrow-band communication.

The local beacon may interface by wireless with controlling and/or information communicating infrastructure means, for example a central service provider or the Internet, and/or with one or more further local beacons. The air interface is achievable to advantage by a mobile wireless link suitable as e.g. GSM or UMTS, by wireless LAN link or infrared link.

As an alternative thereto the local beacon may be uni- or bi-directionally linked to the controlling and/or information communicating infrastructure means, for example, a central service provider or the Internet and/or to one or more further local beacons via a power line communications link. This power line communications link is achievable to advantage using the power supply of the lighting equipment or lamp.

Instead of a power line communications link, communication with infrastructure means may also be made by separate cabling, e.g. also by means of wiring as used to control the lighting equipment or lamp.

The data to be sent to or swapped by the end devices may also be incoming to a cache of a local beacon or may be also outgoing from a cache of a local beacon. Data relating to local information is expediently cached in the local beacon.

One advantageous embodiment consists of the local beacon being integrated in a lamp belonging to a lighting equipment, i.e. for example in an incandescent lamp, halogen lamp, energy saving lamp or a fluorescent tube. The local beacon may also be integrated in a lamp array forming the lighting equipment.

The local beacon can also be successfully integrated in the starter of a fluorescent tube belonging to a lighting equipment or accommodated in an adapter between the lamp and its socket.

Expediently the power supply of the lighting equipment is simultaneously the power supply of the local beacon. On a discontinuously operated lighting equipment an energy storage means, e.g. a rechargeable battery or capacitor is to advantage assigned to the local beacon or a solar cell array assignable as a backup power supply.

The processing functionality of the local beacon of a data communications system in accordance with the invention may involve to advantage routing, currency conversion, reservations, authentication, further cryptographic operations or the like.

The local beacon can be devised for transmitting navigational data. The navigational data transmitted by the local beacon may include information and maps saved local thereto which in such a special instance can also be devised as a beacon for transmission only, i.e. having no receiver with respect to communication from the end-device. Further, direction finding signals can be spewed to the user.

To advantage, the local beacon can be pre-programmed by smart cards or E-PROMs, DIP switches or the like.

In accordance with one further embodiment of the data communications system in accordance with the invention means may be provided for identifying a lighting equipment containing a local beacon, for example by means of a special color code or pattern.

The data communications system in accordance with the invention is compatible to advantage with JINI® protocol and JAVA® environment.

BRIEF DESCRIPTION OF THE DRAWINGS

The invention will now be detailed by way of example embodiments as shown in the drawings in which.

DETAILED DESCRIPTION

Figure 1:
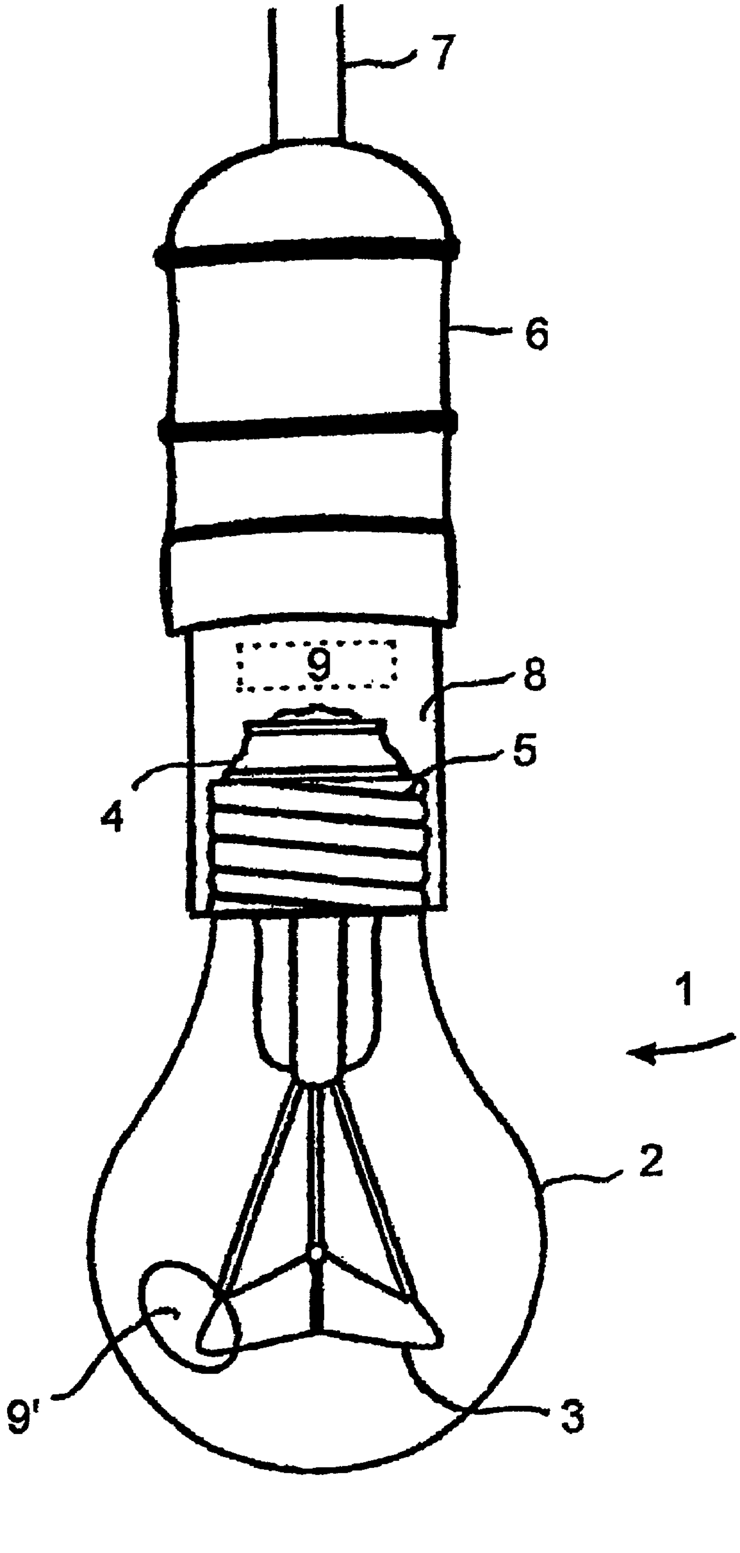
FIG. 1 is a diagrammatic view of a local beacon arranged in an adapter of an incandescent lamp and as an alternative in the local beacon itself.

Referring now to FIG. 1 there is illustrated an incandescent lamp identified in its entirety by the reference numeral 1 whose bulb 2 is filled as usual with an inert gas such as argon, krypton or the like. Accommodated in the bulb 2 is a filament 3 held by a support. The bulb 2 is directly connected to a base 4 having a standard outer screw thread. Illustrated at the top in FIG. 1 is a socket 6 to which electricity is supplied via a power line 7.

Provided between the incandescent lamp 1 and the socket 6 is local transceiver 9 accommodated in an adapter 8 and depicted in FIG. 1 diagrammatically by a broken line rectangle as the smart beacon of a wireless data communications system.

As an alternative, a local transceiver 9' of a wireless data communications system may also be accommodated as a smart beacon within the bulb 2 of the incandescent lamp 1. This location of the local transceiver 9' as shown in FIG. 1 at the end of the support carrying the filament 3 is particularly of advantage since this achieves a direct power supply of the local transceiver 9'. More particularly, a spiral design of the filament 3 enables this to double as the antenna of the local transceiver 9'.

If the luminaire is continuously ON the local transceiver 9 contained in the adapter 8 or the local transceiver 9' accommodated in the bulb 2 of the incandescent lamp 1 has a continuous power supply and is thus always functionable.

If, however, the incandescent lamp 1 is operated discontinuously then either an energy storage e.g. in the form of a rechargeable battery or capacitor is needed or, however, a separate controller needs to be provided for switching actions in assuring the power supply to the local transceiver 9 or 9'.

The local transceiver 9 or 9' integrated in the incandescent lamp 1 is provided with a smart cache and/or processing functionality as regards the data for wireless communication.

Figure 2:
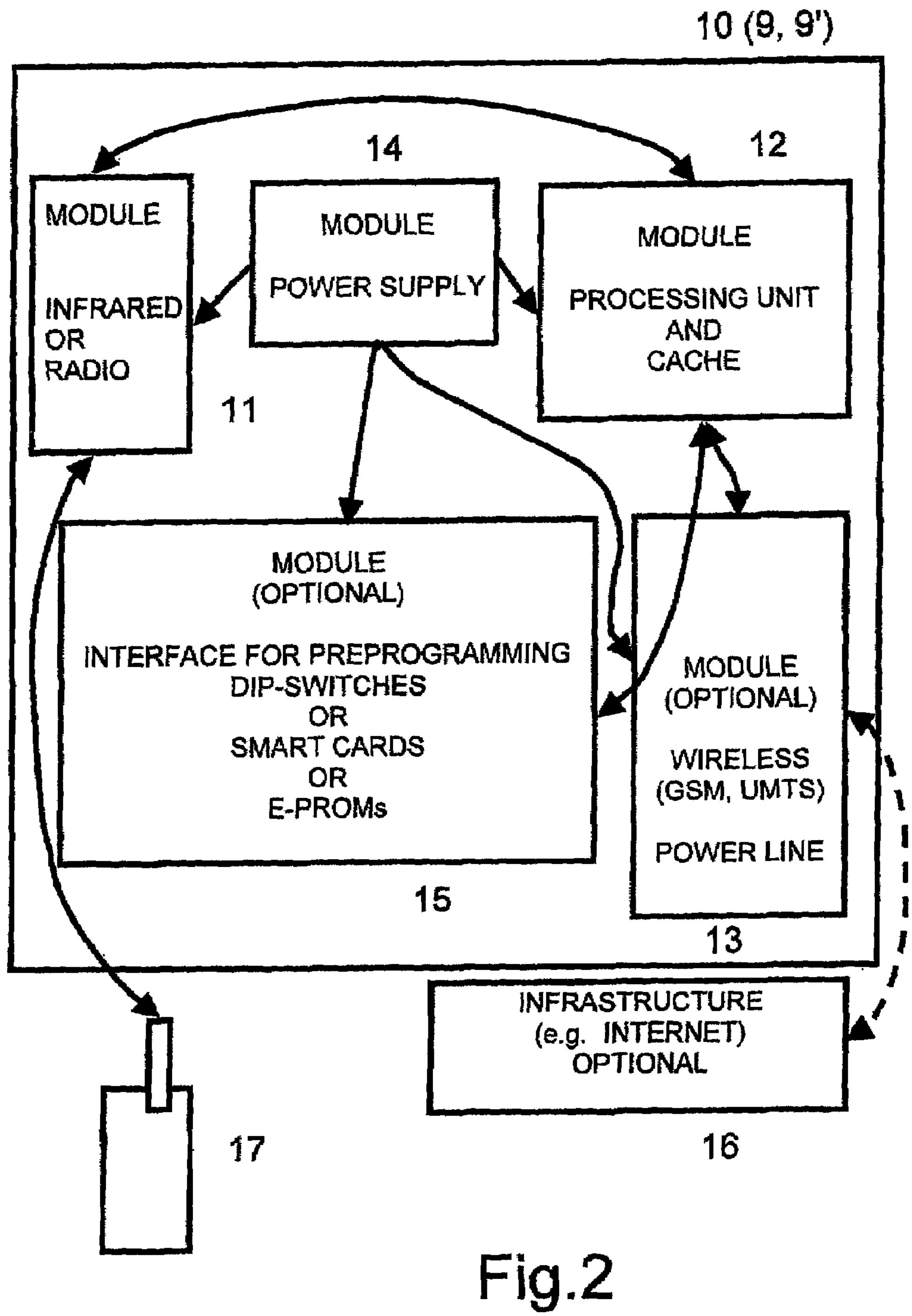
FIG. 2 is a block diagram of a local beacon of a data communications system integrated in a lighting equipment.

Referring now to FIG. 2 there is illustrated a block diagram of one advantageous example embodiment of a suitable local transceiver 9 or 9' incorporated in the incandescent lamp 1.

The local transceiver 9 or 9' (of FIG. 1) forming a beacon 10 consists of five cooperating modules 11 to 15. Via module 13 the beacon 10 is able to optionally communicate by means of a GSM or UMTS radio link with an outer infrastructure 16, e.g. a central service provider. In module 12, consisting of a processing unit and a cache, outgoing and incoming communicating information can be processed and/or cached by smart ways and means.

Via module 11 the beacon 10 then communicates with a user end devices 17, e.g. a cellular phone, by means of a Bluetooth wireless link or an infrared link. Module 14 serves power supply of the beacon 10. The module 14 itself is connected to the power line in making use of the power supply of the lamp in which the beacon 10 is integrated. The optional module 15 forms an interface for pre-programming in the form of DIP switches, smart cards or E-PROMs.

Several beacons 10 each integrated in a lighting means infrastructure can communicate with each other via wireless LAN. In this case several end devices 17, e.g. cellular phones intercommunicate via a Bluetooth radio link with the beacon 10 and from one beacon to another beacon 10 per wireless LAN and from beacon 10 to the other end devices 17 per Bluetooth radio link.

A few further example applications for local transceivers or for transmission only forming beacons will now be listed in the scope of the data communications system in accordance with the invention:

1. A beacon integrated in an incandescent lamp or fluorescent tube and containing the time schedule of public commuter facilities updated by GSM or UMTS suitable for use by means of a Bluetooth mobile end device.
2. A beacon integrated in an incandescent lamp or fluorescent tube whose position in the form of local coordinates is made known by Bluetooth transmission.
3. A beacon integrated in an incandescent lamp or fluorescent tube and implementing routing for the end device communicating therewith.
4. A beacon integrated in an incandescent lamp or fluorescent tube and furnishing multimedia data, e.g. music data or video clips; multimedia data caching duration decided by the processing functionality of the beacon.
5. A beacon integrated in an incandescent lamp or fluorescent tube and spewing advertising.
6. A beacon integrated in an incandescent lamp or fluorescent tube in a restaurant as a menu cache capable of taking orders and relaying them to the kitchen.
7. A beacon integrated in an incandescent lamp or fluorescent tube is pre-programmed by smart carts or E-PROMs, DIP switches or the like.

What is claimed is:

1. A data communications system comprising a local beacon, communicating with controlling and/or information communicating infrastructure means and/or with at least one further local beacon and which contains, for wireless communication with at least one end device located in vicinity of the local beacon, one of a transceiver combination or, in special cases, a transmitter only, said local beacon being located in, on or in place of an electric lighting equipment, wherein said local beacon comprises a smart module relating to data to be transmitted wirelessly, which includes a memory and a processing unit, the memory being capable of caching information so that said information can then be repeatedly sent to users equipped with a suitable end device without having to be fetched every time from said infrastructure means, and said processing unit being capable of outsourcing certain processing actions, otherwise implemented in a central processing unit of said infrastructure means or in said end device itself, to the local beacon, and wherein the smart module of said local beacon makes a decision as to which data and how long said data are to be cached.

2. The data communications system as set forth in claim 1, wherein various algorithms are used to make said decision as to which relate to point in time analysis of “stale” retrievals and delays in data links via said data infrastructure means.

3. The data communications system as set forth in claim 1, wherein said infrastructure means is a central provider.

4. The data communications system as set forth in claim 1, wherein said infrastructure means is the Internet.

5. The data communications system as set forth in claim 1, wherein the communication link between said local beacon and said controlling and/or information communicating infrastructure means is formed by an air interface.

6. The data communications system as set forth in claim 5, wherein said air interface is achieved by a mobile radio telephone link.

7. The data communications system as set forth in claim 5, wherein said air interface is achieved by a wireless LAN link.

8. The data communications system as set forth in claim 5, wherein said air interface is achieved by an infrared link.

9. The data communications system as set forth in claim 1, wherein said communications link between said local beacon and said controlling and/or information communicating infrastructure means and/or with at least one further local beacon is formed by a power line in a uni-directional or bi-directional link.

10. The data communications system as set forth in claim 9, wherein said power line link is achieved via one of a power supply of said lighting equipment or of a lamp forming said lighting equipment.

11. The data communications system as set forth in claim 10, wherein the power supply of said lighting equipment is simultaneously the power supply of said local beacon.

12. The data communications system as set forth in claim 11, wherein on a discontinuously operated lighting equipment an energy storage means is assigned to one of said local beacon or a solar cell array assignable as a backup power supply.

13. The data communications system as set forth in claim 10, wherein said local beacon is pre-programmed by smart cards, E-PROMs or DIP switches.

14. The data communications system as set forth in claim 10, wherein means are provided for identification by persons of a lighting equipment containing a local beacon.

15. The data communications system as set forth in claim 14, wherein said means for identification is a special color code of said lighting equipment containing said local beacon.

16. The data communications system as set forth in claim 14, wherein said means for identification is a special pattern of said lighting equipment containing said local beacon.

17. The data communications system as set forth in claim 1, wherein said communications link between said local beacon and said controlling and/or information communicating infrastructure means is formed by separate cable links in a uni-directional or bi-directional link.

18. The data communications system as set forth in claim 17, wherein said communications link is made by means of wiring as used to control at least one of said lighting equipment or lamp.

19. The data communications system as set forth in claim 1, wherein said data to be sent to or swapped by said at least one end device are input into the memory of said local beacon.

20. The data communications system as set forth in claim 19, wherein local information regarding said data are cached in the memory of said local beacon.

21. The data communications system as set forth in claim 1, wherein said data to be sent to or swapped by said at least one end device are output from the memory of said local beacon.

22. The data communications system as set forth in claim 1, wherein wireless communication between said local beacon and said at least one end device is achieved by radio, requiring both said local beacon and said at least one end device to be designed compatible with said corresponding wireless operating mode.

23. The data communications system as set forth in claim 1, wherein wireless communication between said local beacon and said at least one end device is made by means of infrared beaming, said local beacon and said at least one end device being designed compatible with said corresponding infrared operating mode.

24. The data communications system as set forth in claim 1, wherein said local beacon is integrated in a lamp belonging to said lighting equipment.

25. The data communications system as set forth in claim 1, wherein said local beacon is integrated in a lamp array forming said lighting equipment.

26. The data communications system as set forth in claim 1, wherein said local beacon is integrated in a starter of a fluorescent tube belonging to said lighting equipment.

27. The data communications system as set forth in claim 1, wherein said local beacon is accommodated in an adapter between a lamp belonging to said lighting equipment and its socket.

28. The data communications system as set forth in claim 1, wherein the processing unit of said module of said local beacon involves routing, currency conversion, reservations, authentication or other cryptographic operations.

29. The data communications system as set forth in claim 1, wherein said local beacon is devised for transmitting navigational data.

30. The data communications system as set forth in claim 29, wherein said navigational data transmitted by said local beacon include information and maps saved locally thereto.

31. The data communications system as set forth in claim 29, wherein direction finding signals transmitted for users count as said transmitted navigational data.

32. The data communications system as set forth in claim 1, wherein said local beacon is pre-programmed by smart cards, E-PROMs or DIP switches.

33. The data communications system as set forth in claim 1, compatible with the JINI® protocol.

34. The data communications system as set forth in claim 1, compatible with the JAVA® protocol.

* * * * *